US010800133B2

(12) United States Patent
Greenfield

(10) Patent No.: US 10,800,133 B2
(45) Date of Patent: *Oct. 13, 2020

(54) SYSTEM AND METHOD FOR PRODUCING A FACING FOR A BOARD PRODUCT WITH STRATEGICALLY PLACED SCORES

(71) Applicant: Scorrboard, LLC, Renton, WA (US)

(72) Inventor: Giles Greenfield, Renton, WA (US)

(73) Assignee: Scorrboard, LLC, Renton, WA (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/134,153

(22) Filed: Apr. 20, 2016

(65) Prior Publication Data
US 2017/0305101 A1  Oct. 26, 2017

(51) Int. Cl.
*B32B 3/26* (2006.01)
*B65D 5/42* (2006.01)
(Continued)

(52) U.S. Cl.
CPC .......... *B32B 3/266* (2013.01); *B31F 1/0012* (2013.01); *B31F 1/2804* (2013.01); *B31F 1/2822* (2013.01); *B32B 3/26* (2013.01); *B32B 3/28* (2013.01); *B32B 7/12* (2013.01); *B32B 7/14* (2013.01); *B32B 29/005* (2013.01);
(Continued)

(58) Field of Classification Search
CPC ........... B32B 3/266; B32B 3/28; B32B 23/06; B32B 29/08; Y10T 428/24322; Y10T 428/24694
See application file for complete search history.

(56) References Cited

U.S. PATENT DOCUMENTS 762,033 A  6/1904 Ferres
1,504,218 A  8/1924 Crowell
(Continued)

FOREIGN PATENT DOCUMENTS

AU  2014232272  10/2015
AU  2014265869  10/2015
(Continued)

OTHER PUBLICATIONS

Machine translation of applicant cited CN2841324, (Year: 2006).*
(Continued)

*Primary Examiner* — Donald J Loney
(74) *Attorney, Agent, or Firm* — FisherBroyles LLP; Kevin D. Jablonski

(57) ABSTRACT

A system and method for producing a board product made from paper products that have a pre-scored facing in addition to a medium (sometimes called fluting). Conventional corrugated board may feature a cross-corrugated medium and one or more facing that have no score lines that are impressed (at least prior to assembly with the corrugated medium). Such a conventional board product may be inferior because any score lines that are impressed will damage the underlying corrugated medium in some manner. A breakdown in the strength of the underlying medium leads to poor precision when the eventual board product is scored, cut, and folded. A lack of precision in folding a board product leads to gap variation and fishtailing as any articulated portion of the board product may not maintain a precise plane of articulation when folded.

14 Claims, 7 Drawing Sheets

(51) Int. Cl.

| | | |
|---|---|---|
| *D21H 25/00* | (2006.01) | |
| *B32B 3/28* | (2006.01) | |
| *B32B 29/06* | (2006.01) | |
| *B31F 1/28* | (2006.01) | |
| *B65D 5/02* | (2006.01) | |
| *B31F 1/00* | (2006.01) | |
| *B32B 29/00* | (2006.01) | |
| *B32B 7/12* | (2006.01) | |
| *B32B 7/14* | (2006.01) | |
| *B32B 29/08* | (2006.01) | |
| *B32B 37/14* | (2006.01) | |
| *B32B 37/12* | (2006.01) | |
| *B32B 38/04* | (2006.01) | |
| *B32B 38/18* | (2006.01) | |
| *B32B 23/06* | (2006.01) | |

(52) U.S. Cl.
CPC .............. *B32B 29/06* (2013.01); *B32B 29/08* (2013.01); *B65D 5/02* (2013.01); *B65D 5/4266* (2013.01); *D21H 5/0092* (2013.01); *D21H 25/00* (2013.01); *D21H 25/005* (2013.01); *B32B 23/06* (2013.01); *B32B 37/12* (2013.01); *B32B 37/1284* (2013.01); *B32B 37/14* (2013.01); *B32B 38/1841* (2013.01); *B32B 2038/045* (2013.01); *B32B 2250/02* (2013.01); *B32B 2250/03* (2013.01); *B32B 2250/26* (2013.01); *B32B 2307/50* (2013.01); *B32B 2307/718* (2013.01); *B32B 2317/12* (2013.01); *B32B 2439/00* (2013.01); *B32B 2553/00* (2013.01); *Y10T 428/24322* (2015.01); *Y10T 428/24694* (2015.01)

(56) References Cited

U.S. PATENT DOCUMENTS

| | | |
|---|---|---|
| 1,582,841 A | 4/1926 | Lorenz |
| 1,620,367 A | 3/1927 | Lion |
| 1,692,720 A | 11/1928 | Cannard |
| 1,863,973 A | 6/1932 | Ellis, Jr. |
| 1,924,873 A | 8/1933 | Moone |
| 2,054,867 A | 9/1936 | Rudin et al. |
| 2,089,898 A | 8/1937 | Kappler |
| RE20,970 E | 1/1939 | Rowe et al. |
| 2,359,314 A * | 10/1944 | Klein .................. C09J 7/21 |
| | | 428/355 AK |
| 2,409,195 A | 10/1946 | Crawford |
| 2,474,391 A | 6/1949 | Bergstein |
| 2,485,020 A | 10/1949 | Staude |
| 2,503,874 A | 4/1950 | Ives |
| 2,651,448 A | 8/1950 | Dusseault |
| 2,547,880 A | 4/1951 | Meyer et al. |
| 2,576,278 A | 11/1951 | Bode |
| 2,758,047 A | 8/1956 | Dowd |
| 2,960,145 A | 11/1960 | Ruegenberg |
| 3,002,876 A | 10/1961 | Rosati |
| 3,039,372 A | 6/1962 | La Bombard |
| 3,122,300 A | 2/1964 | La Bombard |
| 3,156,599 A | 11/1964 | Keesee |
| 3,178,494 A | 4/1965 | Tisdale |
| 3,290,205 A | 12/1966 | Goldstein et al. |
| 3,449,157 A | 6/1969 | Wandel |
| 3,526,566 A | 9/1970 | McIlvain, Jr. et al. |
| 3,529,516 A * | 9/1970 | Dorsey et al. ....... B65D 5/4266 |
| | | 229/5.85 |
| 3,542,636 A | 11/1970 | Wandel |
| 3,735,674 A | 5/1973 | Haddock |
| 3,773,587 A | 11/1973 | Flewwelling |
| 4,034,135 A | 7/1977 | Passmore et al. |
| 4,126,508 A | 11/1978 | Hoelzinger |
| 4,140,564 A | 2/1979 | Schrader |
| 4,179,253 A | 12/1979 | Lightfoot |
| 4,259,950 A | 4/1981 | Klippel |
| 4,268,555 A | 5/1981 | Kantz |
| 4,285,764 A | 8/1981 | Salvai |
| 4,437,850 A | 3/1984 | Ono |
| 4,437,851 A | 3/1984 | Salenbo |
| 4,541,895 A | 9/1985 | Albert |
| 4,544,597 A | 10/1985 | Peer, Jr. et al. |
| 4,618,391 A | 10/1986 | Torti et al. |
| 4,657,611 A | 4/1987 | Guins |
| 4,693,413 A * | 9/1987 | McFarland .......... B65D 5/4266 |
| | | 229/122.32 |
| 4,748,067 A | 5/1988 | Cline |
| 4,800,286 A | 1/1989 | Brears |
| 4,800,826 A | 1/1989 | Shiskin |
| 4,886,563 A | 12/1989 | Bennett et al. |
| 4,931,346 A | 6/1990 | Dardina |
| 4,935,082 A | 6/1990 | Bennett et al. |
| 5,156,901 A | 10/1992 | Tanaka |
| 5,339,577 A | 8/1994 | Snyder |
| 5,356,364 A | 10/1994 | Veith et al. |
| 5,419,796 A | 5/1995 | Miller |
| 5,508,083 A | 4/1996 | Chapman, Jr. |
| 5,537,936 A | 7/1996 | Cordrey |
| 5,581,353 A | 12/1996 | Taylor |
| 5,582,571 A | 12/1996 | Simpson et al. |
| 5,589,257 A * | 12/1996 | Carriker ................ E02D 31/004 |
| | | 405/129.75 |
| 5,630,903 A | 5/1997 | Knorr et al. |
| 5,687,517 A * | 11/1997 | Wiercinski ................ B32B 3/28 |
| | | 52/177 |
| 5,690,601 A | 11/1997 | Cummings et al. |
| 5,733,403 A | 3/1998 | Morley |
| 5,799,861 A | 9/1998 | Bonner et al. |
| 5,857,395 A | 1/1999 | Bohm et al. |
| 5,944,016 A | 8/1999 | Ferko, III |
| 6,056,840 A | 5/2000 | Mills et al. |
| 6,139,938 A | 10/2000 | Lingle et al. |
| 6,143,113 A | 11/2000 | Berube |
| 6,153,037 A | 11/2000 | Kim et al. |
| 6,162,155 A | 12/2000 | Gordon et al. |
| 6,261,666 B1 | 7/2001 | Enderby et al. |
| D467,204 S | 12/2002 | Andresen |
| 6,508,751 B1 | 1/2003 | Weishew et al. |
| 6,800,052 B1 | 10/2004 | Abe |
| 6,836,331 B2 | 12/2004 | Reis et al. |
| 6,871,480 B1 | 3/2005 | Goodrich |
| 7,255,300 B2 | 8/2007 | Johnston |
| 7,413,629 B2 | 8/2008 | Fisher et al. |
| 7,909,954 B2 | 3/2011 | Johnston |
| 7,963,899 B2 | 6/2011 | Papsdorf et al. |
| 8,012,309 B2 | 9/2011 | Pare et al. |
| 8,771,579 B2 | 7/2014 | Kohler |
| 10,363,717 B2 | 7/2019 | Greenfield |
| 2001/0001410 A1 | 5/2001 | Ishibuchi et al. |
| 2003/0137667 A1 | 7/2003 | Reis et al. |
| 2004/0076798 A1 | 4/2004 | Larsson et al. |
| 2004/0089412 A1 | 5/2004 | Topolkaraev |
| 2004/0159693 A1 | 8/2004 | Adachi |
| 2004/0224828 A1 | 11/2004 | Nelles |
| 2005/0209075 A1 | 9/2005 | Kocherga et al. |
| 2006/0151655 A1 | 7/2006 | Johnston |
| 2006/0246261 A1* | 11/2006 | Kasabo .................. B32B 29/08 |
| | | 428/182 |
| 2007/0098887 A1 | 5/2007 | Kohler |
| 2008/0300825 A1 | 12/2008 | Ishibuchi et al. |
| 2009/0029840 A1 | 1/2009 | Chen |
| 2009/0117376 A1 | 5/2009 | Bloembergen et al. |
| 2010/0080941 A1 | 4/2010 | McCarville et al. |
| 2010/0331160 A1 | 12/2010 | Kohler |
| 2011/0014433 A1 | 1/2011 | Trani et al. |
| 2011/0114712 A1 | 5/2011 | Malo et al. |
| 2011/0177298 A1 | 7/2011 | Gardiner |
| 2011/0226847 A1 | 9/2011 | Nakano |
| 2012/0205429 A1 | 8/2012 | Trani et al. |
| 2012/0226250 A1* | 9/2012 | Sato .................. A61F 13/51104 |
| | | 604/367 |
| 2014/0141113 A1 | 5/2014 | Kohler |
| 2014/0166520 A1 | 6/2014 | Hoppe et al. |
| 2015/0010734 A1 | 1/2015 | Van Berlo |

(56) References Cited

U.S. PATENT DOCUMENTS

| | | | |
|---|---|---|---|
| 2015/0114249 A1 | 4/2015 | Comorre | |
| 2015/0307755 A1 | 10/2015 | Krumm et al. | |
| 2016/0167338 A1 | 6/2016 | Greenfield | |
| 2016/0271897 A1 | 9/2016 | Greenfield | |
| 2017/0157894 A9 | 6/2017 | Greenfield | |
| 2017/0305103 A1 | 10/2017 | Greenfield | |
| 2017/0341331 A1 | 11/2017 | Greenfield | |
| 2019/0232600 A1 | 8/2019 | Greenfield | |

FOREIGN PATENT DOCUMENTS

| | | |
|---|---|---|
| CA | 2907431 | 9/2014 |
| CA | 2907392 | 11/2014 |
| CL | 1997000270 A | 10/1997 |
| CL | 2004000310 A | 3/2005 |
| CL | 2012002694 A | 3/2013 |
| CL | 2014000247 A1 | 1/2014 |
| CL | 56755 | 3/2014 |
| CL | 2013002596 A | 4/2014 |
| CL | 2014003401 A | 4/2015 |
| CL | 2015002781 A1 | 9/2015 |
| CL | 2018002987 A1 | 2/2019 |
| CL | 2018002988 A1 | 2/2019 |
| CL | 2018002989 A1 | 2/2019 |
| CL | 2018002990 A1 | 2/2019 |
| CN | 1092355 A | 9/1994 |
| CN | 1126457 | 7/1996 |
| CN | 1148360 A | 4/1997 |
| CN | 1150403 A | 5/1997 |
| CN | 1469802 A | 1/2004 |
| CN | 2806125 Y | 8/2006 |
| CN | 2841324 | 11/2006 |
| CN | 101259765 A | 9/2008 |
| CN | 101772457 A | 7/2010 |
| CN | 101952120 | 1/2011 |
| CN | 102470624 A | 5/2012 |
| CN | 202986283 U | 6/2013 |
| CN | 104494211 A | 4/2015 |
| CN | 105121147 | 12/2015 |
| CN | 105121148 | 12/2015 |
| EP | 1110709 A2 | 6/2001 |
| EP | 2969522 | 1/2016 |
| EP | 2969526 | 1/2016 |
| EP | 3436649 A1 | 2/2019 |
| EP | 3445583 A4 | 2/2019 |
| FR | 2596033 A1 | 3/1986 |
| FR | 2594160 A3 | 8/1987 |
| GB | 594328 A | 11/1947 |
| GB | 977069 A | 12/1961 |
| GB | 1542765 | 3/1979 |
| GB | 2144077 A | 2/1985 |
| GB | 2258189 A | 2/1993 |
| GB | 2301316 A | 5/1995 |
| GB | 2368074 A | 4/2002 |
| HK | 1212298 | 6/2016 |
| HK | 1212302 | 6/2016 |
| JP | 62-116133 | 5/1987 |
| JP | 02-235623 A | 9/1990 |
| JP | H03-106031 | 11/1991 |
| JP | 03-275292 A | 12/1991 |
| JP | 1996-309889 A | 11/1996 |
| JP | 2003291230 A | 6/2001 |
| JP | 2007152689 A | 6/2007 |
| JP | 2009172942 A | 8/2009 |
| JP | 2011/079207 A | 4/2011 |
| JP | 2011079207 A | 4/2011 |
| JP | 2013-523492 | 6/2013 |
| JP | 2016-519008 | 6/2016 |
| JP | 2016515959 | 6/2016 |
| JP | 2019514726 A | 6/2019 |
| KR | 2000-0058870 | 10/2000 |
| KR | 2000/0058870 A | 10/2000 |
| KR | 1008/66390 B1 | 11/2008 |
| KR | 100866390 B1 | 11/2008 |
| KR | 20110104772 A | 9/2011 |
| KR | 20160008170 | 1/2016 |
| KR | 20160008518 | 1/2016 |
| PH | 12015502380 | 2/2016 |
| PH | 12015502381 | 2/2016 |
| WO | 9427813 A1 | 12/1994 |
| WO | WO 95/35204 A1 | 12/1995 |
| WO | 98/18614 | 5/1998 |
| WO | 1999047347 | 9/1999 |
| WO | 01/58679 A1 | 8/2001 |
| WO | 2004052635 A1 | 6/2004 |
| WO | 2009/101526 A1 | 8/2009 |
| WO | 2012128604 | 9/2012 |
| WO | 2013/019126 A1 | 2/2013 |
| WO | WO 2013/098353 A1 | 7/2013 |
| WO | 2014146036 | 9/2014 |
| WO | 2014186043 | 11/2014 |
| WO | WO 2015/128546 A1 | 9/2015 |
| WO | 2017184447 A1 | 10/2017 |

OTHER PUBLICATIONS

U.S. Appl. No. 15/077,250, entitled System and Method for Inducing Fluting in a Paper Product by Embossing With Respect to Machine Direction, filed Mar. 22, 2016; 21 pages.

U.S. Appl. No. 15/088,999, entitled System and Method for Producing Multi-Layered Board Having a Corrugated Medium and an Embossed Medium, filed Apr. 1, 2016; 22 pages.

Supplementary European Search Report for European application No. EP14762807, European Patent Office, The Hague, Jun. 21, 2016, pp. 5.

First Office Action and Search Report along with English Translation for Chinese Application No. 201480016009X, dated Aug. 3, 2016, pp. 17.

First Examination Report for New Zealand Patent Application Serial No. 712616, New Zealand Intellectual Property Office, dated Nov. 30, 2015, pp. 2.

First Examination Report for New Zealand Patent Application Serial No. 712611, New Zealand Intellectual Property Office, dated Nov. 30, 2015, pp. 2.

International Search Report based on PCT/US2014/030916; dated Aug. 22, 2014, pp. 3.

International Search Report based on PCT/US2014/030909; dated Aug. 20, 2014, pp. 3.

First Patent Examination Report for Australian Patent Application Serial No. 2014232272, Australian Government, IP Australia, dated Mar. 3, 2016, pp. 3.

First Patent Examination Report for Australian Patent Application Serial No. 2014265869, Australian Government, IP Australia, dated Apr. 21, 2016, pp. 2.

Internation Search Report & Written Opinion, dated Jul. 21, 2017; PCT/US2017/025531, filed Mar. 31, 2017.

International Search Report and Written Opinion dated Jul. 6, 2017; PCT Appl. US2017/25491, filed Mar. 31, 2017.

International Search Report & Written Opinion dated Jun. 15, 2017; PCT Appl. No. US17/23611 filed Mar. 22, 2017.

International Search Report & WrittenOpinion dated Jun. 27, 2017; PCT Appl. No. US17/25510; filed Mar. 31, 2017.

International Search Report & Written Opinion dated Jun. 30, 2017; PCT Appl. No. US17/027624; filed Apr. 14, 2017.

WO dated Aug. 20, 2009 for PCT/IB2009/000271 filed Feb. 13, 2009.

European Extended Search Report; European Patent Organization; EP 14797031.3; dated Oct. 31, 2016; pp. 1-8.

Second Examination Report for New Zealand Patent Application Serial No. 712611, New Zealand Intellectual Property Office, dated Jul. 6, 2016, pp. 3.

Mikami et al.; "Analysis of normal compression strength of corrugated board sheet by the finite element method"; Journal of Packaging Science & Technology, Japan, vol. 13 No. 4, pp. 143-252.

European Patent Office; Extended European Search Report dated Nov. 27, 2019; EPO Application No. 17786318.0; pp. 1-8.

European Patent Office; Extended European Search Report dated Nov. 28, 2019; EPO Application No. 17776824.9; pp. 1-7.

(56) References Cited

OTHER PUBLICATIONS

European Patent Office; Extended European Search Report dated Nov. 21, 2019; EPO Application No. 17786382.6; pp. 1-8.
European Patent Office; Extended European Search Report dated Nov. 21, 2019; EPO Application No. 17786317.2; pp. 1-7.
European Patent Office; Extended European Search Report dated Jul. 15, 2019; EP Application No. 17771068.8; pp. 1-6.
European Patent Office; Extended European Search Report dated Nov. 7, 2019; EPO Application No. 17786383.4; pp. 1-7.
EMS Innovations Inc., "Adult Dispos-A-Board", published on Youtube.com on Mar. 2, 2012, retrieved from URL https://www.youtube.com/watch?v=Ses-wKU5ht4 on Apr. 29, 2020 (Year: 2012).

* cited by examiner

SYSTEM AND METHOD FOR PRODUCING A FACING FOR A BOARD PRODUCT WITH STRATEGICALLY PLACED SCORES

CROSS-RELATED APPLICATIONS

This application is related to U.S. patent application Ser. No. 15/077,250, entitled SYSTEM AND METHOD FOR INDUCING FLUTING IN A PAPER PRODUCT BY EMBOSSING WITH RESPECT TO MACHINE DIRECTION, filed 22 Mar. 2016, and is related to U.S. patent application Ser. No. 15/088,999, entitled SYSTEM AND METHOD FOR PRODUCING MULTI-LAYERED BOARD HAVING A CORRUGATED MEDIUM AND AN EMBOSSED MEDIUM, filed 1 Apr. 2016; further, the present application is also related to U.S. patent application Ser. No. 15/134,106, entitled SYSTEM AND METHOD FOR PRODUCING A MULTI-LAYERED BOARD HAVING A MEDIUM WITH IMPROVED STRUCTURE filed 20 Apr. 2016; and is related to U.S. patent application Ser. No. 15/134,176 entitled SYSTEM AND METHOD FOR PRODUCING AN ARTICULATING BOARD PRODUCT HAVING A FACING WITH SCORE LINES IN REGISTER TO FLUTING filed 20 Apr. 2016; and is related to U.S. patent application Ser. No. 15/134,206, entitled SYSTEM AND METHOD FOR PRODUCING MULTI-LAYERED BOARD HAVING AT LEAST THREE MEDIUMS WITH AT LEAST TWO MEDIUMS BEING DIFFERENT filed 20 Apr. 2016, all of the foregoing applications are incorporated herein by reference in their entireties.

BACKGROUND

Modern paper-making techniques use paper machines at paper mills to produce rolls of paper that, in turn, can be used by board makers to produce board products (i.e., corrugated board). As a result, rolls of paper may be produced from machines that operate continuously. Modern paper machines typically produce paper from a number of substances including wood pulp that comprise wood fibers (although other fibers may also be used). These fibers tend to be elongated and suitable to be aligned next to one another. The fiber starts as a slurry that can be fed onto a moving screen from a head box of the paper machine. In modern paper machines, the fibers tend to align with each other and align with a direction in which the screen is moving. This alignment direction of underlying fibers is called the major direction of the paper and is in line with the machine direction. Thus, the major direction is often simply called the machine direction (MD) and the paper that is produced has an associated MD value.

When paper is used to make a board product, portions or layers of the board product may be corrugated. Conventional corrugating machines will corrugate the underlying paper product in the cross direction (CD) of the paper thereby failing to take advantage of the natural strength bias of the paper in the machine direction. Further, the greater natural strength qualities of paper in the machine direction are left unharnessed by cross corrugation techniques in board making solutions. Further yet, conventional corrugated medium includes flutes that take on a sinusoidal shape because of the shape of the protrusions in a conventional pair of corrugating rolls. As a result, companies that produce conventional board products remain entrenched in old production processes that limit the strength of the board product.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed herein without departing from the spirit and scope of the present detailed description. The present disclosure is not intended to be limited to the embodiments shown, but is to be accorded the widest scope consistent with the principles and features disclosed or suggested herein.

By way of overview, the subject matter disclosed herein may be directed to a system and method for producing a board product made from paper products that have a pre-scored facing in addition to a medium (sometimes called fluting) such that precise articulation may be induced. A conventional board product may feature a cross-corrugated medium and one or more facings that have no score lines that are imprinted (at least prior to assembly with the corrugated medium). Such a conventional board product may be inferior because any score lines that are imprinted will damage the underlying corrugated medium in some manner. A breakdown in the strength of the underlying medium leads to poor precision when the eventual board product is scored, cut, and folded. A lack of precision in a folded container leads to gap variation and fishtailing, as any articulated portion of the board product may not maintain a precise plane of articulation when folded. Hence, the articulated portion "fishtails" out of alignment.

Having a pre-scored facing (sometimes called wall or liner) with strategically placed score lines (e.g., strategically placed with respect to an eventual articulation point and/or with respect to underlying flutes in an attached medium), eliminates problems with fishtailing. This is because the pre-score lines bias the facing to give way at the score lines when articulated. As a result, the fold line on the facing is precisely aligned along the pre-score line (making any fold aligned with a desired box corner pattern) as well as precisely placed with respect to any underlying flutes (making any fold also aligned with the flute pattern). The effects of pre-score lines in a facing may be enhanced when used in conjunction with an embossed medium that exhibit greater structural characteristics when compared to conventional cross-corrugated medium. These advantages and additional aspects of various embodiments of the subject matter disclosed herein are discussed below with respect to FIGS. 1-8.

Figure 1A:
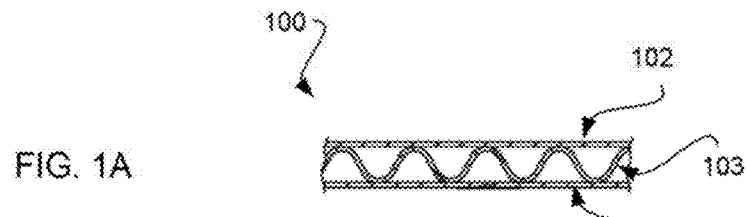
FIGS. 1A-1B are views of a corrugated single wall conventional board product before and after major fold articulation without benefit of score lines in one or more facings.
Figure 1B:
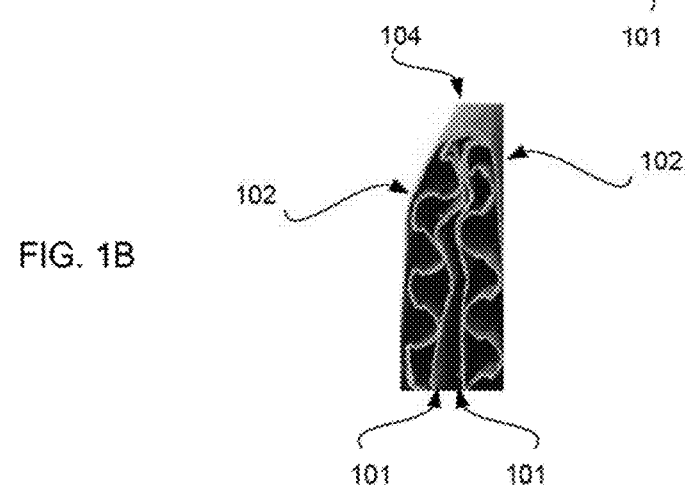

FIGS. 1A-1B are views of a conventional board product 100 before and after major fold articulation without benefit of score lines in one or more facings. As discussed briefly in the summary, score lines will assist with board articulation such that articulation of the board product is precise. In an effort to show problems of conventional board product 100, the views in FIGS. 1A-1B are shown and then various problems with an eventual container are shown in FIGS. 2B-2C to illustrate the effects of the problems of the conventional board product 100. A conventional board product 100 may have some form of a medium 103 that is attached to a first facing 101 and a second facing 202. Of course, these facings do not have any score lines predisposed. As such, certainly there are no score lines in register to the flutes of the medium 103. Further, the medium 103 may also be a conventional cross-corrugated medium having flutes aligned in the cross direction (discussed further below) of the paper of the medium 103.

When one wishes to articulate the board product 100, which is often the case when the board product is eventually used for containers and boxes, a machine may produce a score line (or sometimes, an indentation, an impression, or some other form of marking in order to induce a fold line) at a line intended for articulation (e.g., intended to be a corner or fold point without reference to underlying flutes). Thus, in looking at FIG. 1B, a fold may be intended at point 104. As can be seen, the board product 100 is being articulated (at approximately 180 degrees in this view). A 180 degree fold is sometimes called a major fold and may be a manufacturer requirement for producing folded box blanks. A blank is an unfolded container in a flat open state (as shown FIG. 2A) that is manufactured to eventually be manipulated into a container or box. A conventional regular slotted container (RSC) blank is discussed below with respect to FIGS. 2A-2C.

When a machine makes an impression in the board product in production of a blank, a mechanical impression collar may be used to impress a crease line at a specific location. This location is in relation to an edge of the blank (e.g., 36 inches from the edge of the blank, as but one example); such a location, in conventional methods, is not in relation to underlying flutes of the medium. As a consequence, when the mechanical impression collar impresses a fold line, any underlying flutes that happen to be within the impression area are crushed. By crushing the interior flutes, a significant localized amount of board structure is compromised. Thus, the fold point 104 begins to flex inward and the exterior fold point begins to stretch out around the fold. The interior flutes around the fold begin to narrow as the two legs begin to come together.

FIG. 1B shows the conventional board product in full 180 degree articulation. The first facing 101 has been folded in half so as to come into contact with itself. The second facing 102 has stretched enough at point 104 to accommodate the additional distance around the 180 degree fold point 104. As can be seen, the interior fluting of the medium 103 loses structure as the localized flutes are significantly damaged. Further, the second facing 102 may often fracture at the 180 degree fold point 104. Such fracturing weakens the board product at point 104 significantly. As a result of the fold point 104 causing a breakdown in medium structure as well as possible fracturing in one or more facings, additional undesirable variations in the eventual container or box product will exhibit. These undesired variations are discussed next with respect to FIGS. 2A-2C.

Figure 2A:
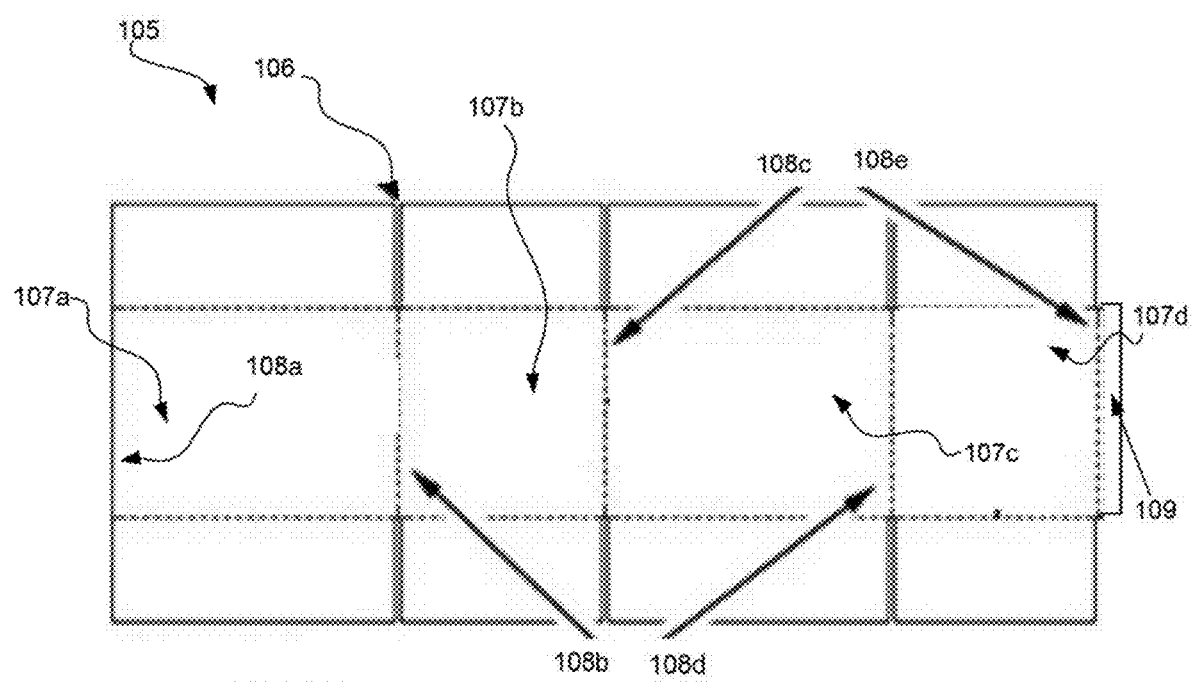
FIGS. 2A-2C show various states of a blank having slots cut and conventional impression lines such that the blank may be manipulated into a container.
Figure 2B:
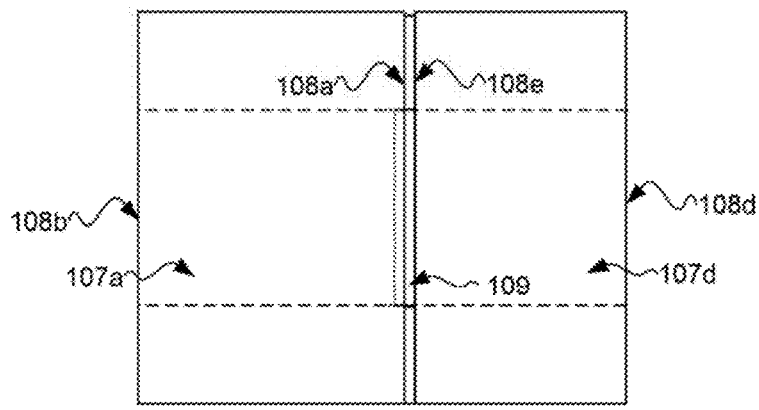
Figure 2C:
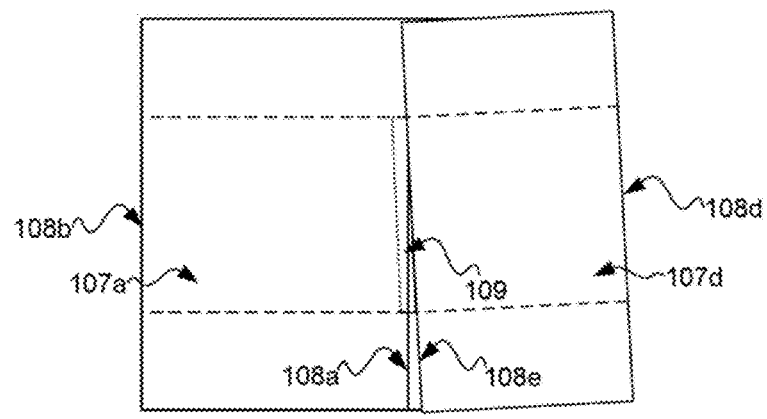

FIGS. 2A-2C show various states of a blank 105 having slots 106 cut and conventional impression lines 108b, 108c, 108d and 108e such that the blank 105 may be manipulated into a container. In FIG. 2A, the blank 105 is shown where a board product may be altered to have the desired features, such as slots and impression lines. Thus, the board product may have a pairs of slots 106 that have been cut along eventual fold lines 108b, 108c, 108d and 108e. The slots 106 should be precisely aligned and sized for the intended purpose and the dimensions shown in FIG. 2A are for illustrative purpose only as but one example of a flat blank 105. As a typical requirement for the end user of a blank, the left-most panel 107a may be folded (at fold line 108b) 180 degrees to lay flat on top of panel 107b. This 180 degree fold is called a major fold. Similarly, the right-most panel 107d may be folded (at fold line 108d) 180 degrees to lay flat on top of panel 107c. Once folded, the ends 108a and 10Be of the blank 105 may then be situated adjacent to each other with a glue lap 109 positioned to in an overlapping manner such that the edge 108a may be adhered to the glue lap 109. When precisely aligned, the edge 108a is positioned next to the edge 108e such that the distance between edges 108a and 108e is the same width of other slots 106 in the blank 105.

When articulated in the manner, the knocked down container blank 105 may be in a folded condition to be fed into a machine for erecting a box or container from the blank. Such an articulation may be useful for packaging and shipping the resultant knocked-down container blank 105 prior to being erected into the box or container. These articulations, when performed on conventional board product, often lead to undesired variations as shown in FIG. 2B-2C.

A first undesired variation is shown in FIG. 28 and is called a gap variation. Gap variation may occur when the edge 108a and 108e are not precisely aligned adjacent to each so as to exhibit a gap that is the same as the width of other slots when the glue lap 109 is adhered to the panel 107a. The gap may be too narrow if the major folds at folds lines 108b and 108d are rolled inward and may be too wide if the major folds at folds lines 108b and 108d are rolled inward. In this view, one can see that the panel 107a has been articulated 180 degrees along major fold line 108b and panel 107d has been articulated 180 degrees along major fold line 108d. However, the glue lap 109 does not significantly overlap the panel 107a and the edges 108a and 108e are too far apart. Without precise overlap, the edges 108a and 108e with glue lap 109 may not be in position to be properly adhered to each other. This gap variation may be caused by compromised major fold lines 108b and 108d because of a lack of precision in the fold lines. Another variation that is not shown in the figures may be when the edge 108a and 108e are too close or even overlap. Gap variations may be characterized as the glue lap having too much overlap or not enough overlap (or even no overlap) and is a variability that leads to undesired problems in the finished container.

A second undesired variation is shown in FIG. 2C and is called "fishtailing." Fishtailing occurs when the fold results in one or more panels being not parallel with other panels. In the example shown in FIG. 2C, the panel 107a is not parallel with the panel 107d. As such, the edge 108a is also not parallel with the edge 108e and the glue lap will not interface with the panel 107a in a precise manner Here, the major fold 108b may be precise enough, but the major fold 108d is not precise and results in the folded over panel 107d fishtailing out of alignment. This results in problems for set-up machines that erect the RSC blanks into boxes or containers.

The problems shown in FIGS. 2A-2C typically occur because of scoring and folding conventional board product without regard to the position of any underlying flutes in the medium. In addition, after-assembly scoring (e.g., scoring that occurs after a board product is assembled) causes damage to flutes as collateral flutes becomes partially or completely crushed to prevent the flutes from tracking the fold line on either side of the desired fold position. Not only does this degrade board/box strength, it allows for irregular folding (rolling scores), resulting in gap variation, as measured at the manufacturers joint. These and other problems may be overcome by pre-scoring facings and then assembling a board product with score lines in register to the underlying flutes of the medium.

Prior to discussing the various embodiments, a brief discussion about cross corrugating and linear embossing is presented. As has been briefly stated above, conventional board products include a conventionally produced corrugated medium (sometimes called a corrugated fluting), e.g., a cross-corrugated medium. A cross-corrugated medium has flutes formed perpendicular to most underlying fibers of the paper product. This results in flutes that are not aligned with the majority of underlying fibers and, therefore, do not take advantage of the natural strength of the MD value of the paper (when compared to the CD value). Such a failure to harness the MD value of the paper leads to loss of opportunity in the manufacturing of board products when specific board strength is to be realized. That is, it will necessarily take more paper (heavier paper, larger flutes, and the like) to realize the required board strength.

A linearly-embossed medium is different from a cross-corrugated medium in that the induced flutes are aligned with the MD value of the paper product. This results in flutes that are aligned with the majority of underlying fibers and, therefore, take advantage of the natural strength of the MD value of the paper (when compared to the CD value). Harnessing the MD value of the paper leads to efficiencies in the manufacturing of board products when specific board strength is to be realized. That is, it will necessarily take less paper (lighter paper, smaller flutes, and the like) to realize the required board strength. Aspects of making, producing, and using linearly embossed mediums are discussed in greater detail in U.S. patent application Ser. No. 15/077,250 entitled "SYSTEM AND METHOD FOR INDUCING FLUTING IN A PAPER PRODUCT BY EMBOSSING WITH RESPECT TO MACHINE DIRECTION" and filed on Mar. 22, 2016, which is incorporated herein by reference in its entirety and for all purposes. Some aspects of a linearly embossed medium are discussed below with respect to FIG. 4. Next, aspects of a pre-scored liner are discussed with respect to FIG. 3.

Figure 3:
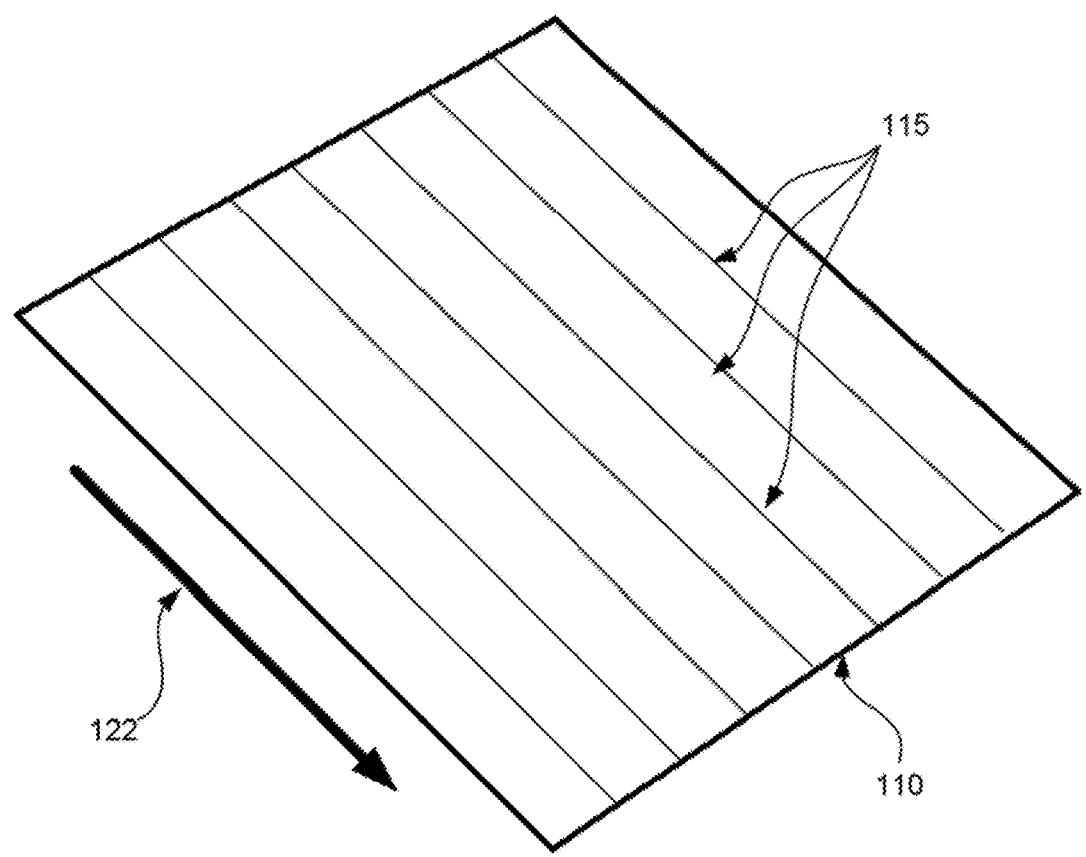
FIG. 3 is an isometric cutaway view of a scored facing that may be part of one or more board products according to one or more embodiments of the subject matter disclosed herein.

FIG. 3 is an isometric cutaway view of a scored facing 110 that may be part of one or more board products according to one or more embodiments of the subject matter disclosed herein. In this embodiment, a facing may be produced having a MD value in the MD direction 122 and having a weight and materials commonly used for a board product facing. The facing 110 may sometimes be called a liner or wall as this layer of a board product is often an innermost portion of the board product. As was briefly discussed above, a facing 110 may often be scored to elicit articulation along a particular line. However, if the facing has already been coupled with one or more additional layers of a board product (e.g., a corrugated medium, an embossed medium, another facing, and the like), then the scoring process will not only leave an impression on the facing 110, but also on any other layer in the board product. As shown in FIGS. 2B-2C, such after-assembly scoring leads to undesired variations and structural damage of the additional layers of the board product, which, in turns, weakens the board product significantly at the articulation point.

The embodiment of FIG. 3, however, may be a facing 110 that has undergone a pre-scoring process such that score lines 115 are impressed into the facing 110 prior to the facing 110 being combined with any other paper product (e.g., any other layer of a board product). In the embodiment shown in FIG. 3, the pre-score lines 115 are equidistant with respect to each other and may be strategically spaced to also be in alignment with an eventual embossed medium (not shown in FIG. 3) having flutes of a similar specific pitch dimension. Further, the score lines may be continuous impressions into the facing 110. However, the "score" line may be any localized weakening of the facing 110 at the desired point of fold of the board product that is strategically placed with respect to the underlying flutes. In other embodiments then, the score may be a crease impression (continuous linear or intermittent), partial slit through the facing 110 (continuous linear or intermittent), perforation in the facing 110, and the like.

In other embodiments not shown, the pre-score lines 115 may be less than consistent across a facing 110. For example, two score lines 115 may be grouped together at approximately five mm apart from each other and then spaced apart from another grouping of two of these five-mm-spaced score lines. In yet another example, only a single grouping of scores may be present on a facing or even a single score line. Although five mm intervals are given as an example, any width of interval may be possible and common intervals will match common flute profiles, such as C-Flute, B-Flute, R-Flute and the like. These groupings may correspond to anticipated articulation points for a specific box machine. However, for the purposes of efficient production of a consistent facing 110, score lines 115 may be impressed by a scoring machine at strategically selected intervals (e.g., every five mm) such that any portion of the pre-scored facing 110 may be combined with other layers of an eventual board product. The embossed medium 130 of FIG. 4 may be one such additional layer.

Figure 4:
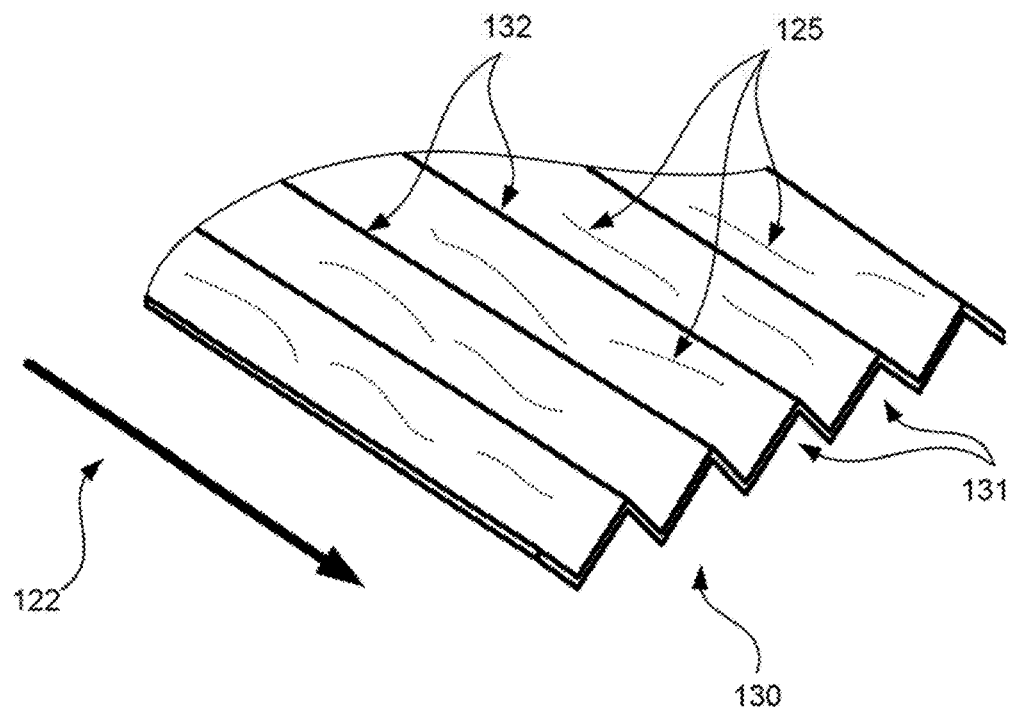
FIG. 4 is an isometric cutaway view of an embossed medium that may be part of one or more board products according to one or more embodiments of the subject matter disclosed herein.

FIG. 4 is an isometric cutaway view of an embossed medium 130 that may be part of one or more board products according to one or more embodiments of the subject matter disclosed herein. This diagram shows an isometric view of a portion of an embossed medium 130 that may be formed from an embossing process. That is, flutes 131 are formed from passing the initial paper product through embossing rolls using a linear-embossing technique such that the flutes 131 are formed congruent with a majority of underlying fibers 125 of the paper. The flutes 131 are also formed congruent with the machine direction 122. A linearly-embossed medium 130 harnesses the natural strength of the paper in the machine direction 122 as the flutes 131 are formed in the machine direction 122 of the paper (e.g., congruent with a majority the underlying fibers 125). Therefore, a linearly-embossed medium 130 harnesses the natural strength of the paper in the machine direction 122. Such an embossed medium 130 may be a component/layer of a board product as discussed below with respect to FIG. 5.

Further, as is shown in FIG. 4, the flutes 131 may form a triangular pattern when viewed from a cutaway perspective. This flute pattern having a triangular repeating shape is referred to as a flute profile. This flute profile provides an improvement in structural integrity of the embossed medium 130 when compared to a flute profile the exhibits a curvilinear or sinusoidal flute profile. Such a curvilinear or sinusoidal flute profile is prevalent in conventional cross-corrugated mediums. Therefore, the triangular flute profile as shown in FIG. 4 is also superior to corrugated mediums with respect to board strength and structural integrity. The flute profile exhibits apexes 132 that may be adhered to a facing (not shown). The apexes may be spaced apart in a repetitive manner at a specific distance (such as five mm, for example). As will be discussed next, when coupled to a matching pre-scored facing 110 of FIG. 3, the apexes 132 of the embossed medium 130 may be precisely aligned in a desired manner to yield precise and less damaging articulation of any resulting board product.

Figure 5:
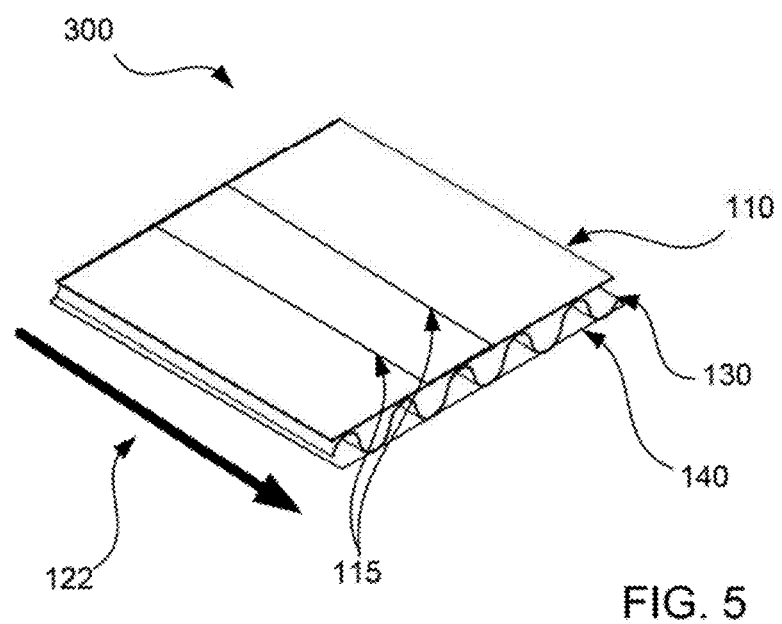
FIG. 5 is an isometric cutaway view of a board product having the scored facing of FIG. 3 and medium of FIG. 4 according to an embodiment of the subject matter disclosed herein.

FIG. 5 is an isometric cutaway side view of a board product 300 having the scored facing 110 of FIG. 1 and the medium 130 of FIG. 4 according to an embodiment of the subject matter disclosed herein. In this embodiment, the board product 300 includes three layers: the first facing 110, the medium 130, and a second facing 140. As is shown, the first facing 110 may form an inner wall (although the top/bottom direction reference to alignment of the board product 300 is arbitrary) that is coupled to one side of the embossed medium 130. The coupling may be through an adhesive applied to the apex of each flute on the top-side of the medium 130 such that the facing 110 is glued to the medium 130 where adhesive is applied. In other embodiments, glue may be applied to the entirety of the facing 110 prior to being coupled to the medium 130.

Likewise, a second facing 140 may form a bottom-side outer wall (again, the top/bottom direction reference is arbitrary) that is coupled to an opposite side of the embossed medium 130. The coupling may be through an adhesive applied to the apex of each flute on the bottom-side of the embossed medium 130 such that the facing 140 is glued to the embossed medium 130 where adhesive is applied. In other embodiments, glue may be applied to the entirety of the facing 140 prior to being coupled to the embossed medium 130.

The score lines 115 are aligned in the direction of underlying flutes of the embossed medium. Both the score lines and the flutes are also aligned with the machine direction 122 of the underlying paper in the scored facing 110, the facing 140 and the medium 130. Further, in this embodiment, the score lines 115 of the scored facing 110 are aligned in a manner such that the score lines are placed equidistant from respective apex locations of the affixed embossed medium. For example, if the top-side apexes of the embossed medium 130 are spaced five mm apart from each other, then the score lines 115 are also spaced five mm apart from each other, but offset by 2.5 mm. That is, for every pair of top-side apexes that are five mm apart, the affixed facing 110 features a score line 115 half way between each pair of top-side apexes at approximately 2.5 mm from each one.

With precisely placed score lines in a facing that is affixed to a medium having linear flutes, precise articulation lines may be induced. That is, if one were to fold the board product 300, the scored facing would give way along one or more score lines in a precise manner. That is, the fold would precisely lie in a single plane that is normal to the score line being articulated. Such a fold may be precise and will serve to prevent the articulation direction from veering out of the normal to the plane of the score line. In other embodiments (not shown), the bottom-side facing 140 may also be pre-scored with a similar pattern of score lines precisely aligned with bottom-side apexes of the embossed medium 130. Further, the pre-scored lines in any facing may cover less than all of the area of the facing (e.g., only score lines in anticipated articulation points).

When all three layers are assembled and affixed, the resultant board product 300 is superior to conventional board product because of several factors. First, because the flutes of the embossed medium 130 are strategically aligned with respect to the score lines of the pre-scored facing 110, any articulation of the board product will be precise resulting in accuracy in the finished box container. Such precision prevents gap variation and fishtailing. Further, the linearly embossed medium 130 includes a flute profile that exhibits superior strength because of the leg structures of the triangular nature of each flute. Further yet, adhesive may be continuously and uniformly applied to each apex in a predictable manner with greater precision as portions of the adhesive will not spill over to the legs as may be the case with sinusoidal apexes having no flat receiving area. Lastly, a pre-scored facing 110 prevents having a scoring step after board assembly that leads to damage of underlying layers (e.g., the embossed medium 130) when conventional board scoring techniques are used.

Figure 6A:
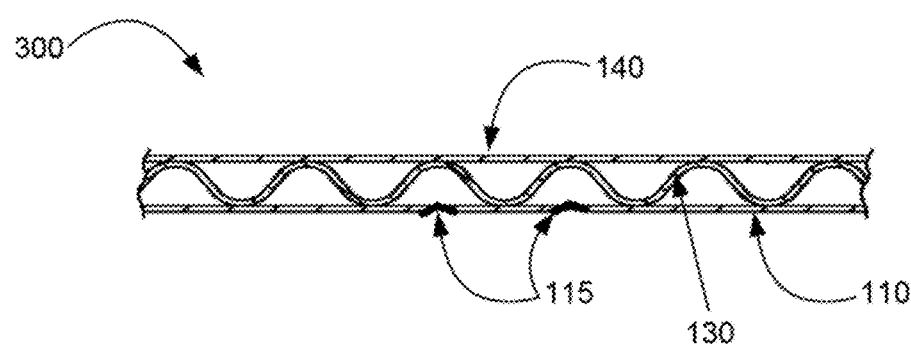
FIGS. 6A-6C are a series of views of the board product of FIG. 5 being articulated with benefit of score lines in one or more facings according to an embodiment of the subject matter disclosed herein.
Figure 6B:
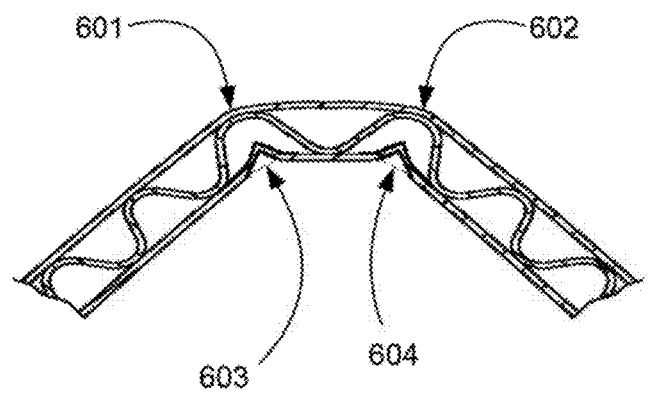
Figure 6C:
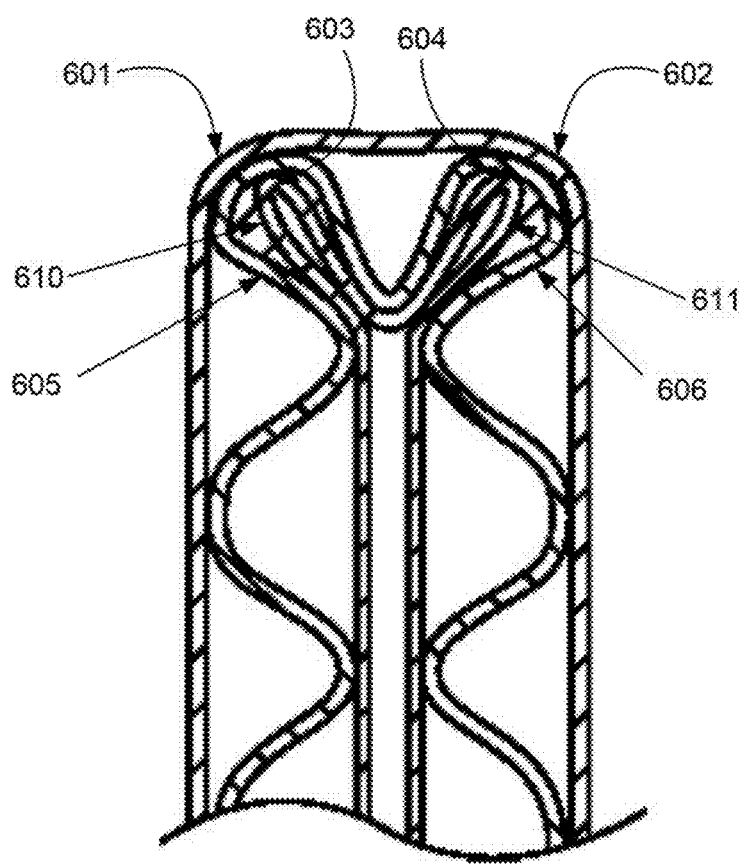

FIGS. 6A-6C are a series of views of the board product 300 of FIG. 5 being articulated with benefit of score lines in one or more facings according to an embodiment of the subject matter disclosed herein. In FIG. 6A, the board product 300 is shown from an edge view so as to better illustrate what happens when the board product 300 is articulated. As shown, the board product 300 includes a first facing 110, a second facing 140 and a medium 130. The medium 130 is disposed between the first facing 110 and the second facing 140. The first facing may further include score lines 115. In this example view of FIG. 6A, the first facing 110 is shown facing down simply for illustrative purposes. Further, only two score lines 115 are shown for ease of illustration as there may be many more score lines in register to the flutes of the medium 130 including score lines on the second facing 140 as well. Further yet, the medium 130 is shown having a sinusoidal flute profile, though it is understood that any shape of flute profile may be used.

In the next view of FIG. 6B, the board product 300 has begun articulation. Here, the fold lines will follow precisely the score lines 115 in the facing 110. Thus a first fold point 603 corresponds to a first score line 115 and a second point 604 corresponds to a second score line. As can be seen is this view of FIG. 6B, an articulation that will result in an eventual 180 degree articulation will comprise two different folds of approximately 90 degrees each. Further, the first fold point 603 is located directly between two apexes (of downward facing flutes—i.e., two apexes affixed to the first facing 110) of the medium 130 such that the legs of this flute begin to move toward each other. As a result, a first stretch point 601 of the second facing 140 begins to forms directly over the first fold point 603. Similarly, the second fold point 604 is located directly between two apexes (of downward facing flutes—i.e., two apexes affixed to the first facing 110) of the medium 130 such that the legs of this flute also begin to move toward each other. As a result, a second stretch point 602 of the second facing 140 begins to forms directly over the second fold point 604.

In FIG. 6C, the board product 300 is shown fully articulated to the 180 degree position. Thus, the first stretch point 601 and the second stretch point 602 are each approximately 90 degrees. Different from the conventional example of FIGS. 1A-18 where the stretch point folded a full 180 degrees, this embodiment accomplishes a full 180 degrees of board product articulation with only having approximately 90 degrees of fold causing a stretch at any given location. Having a full 180 degree articulation with only 90 degrees of stretch at any given point leads to less stress at the stretch points to underlying fibers in the facing 140. This, in turn, leads to greater strength at corners of boxes and containers due to less stretch damage to the facing 140 and no loss of flute structure in the medium 130.

Further, the fold points 603 and 604 fold all the way into a respective flute such that secondary flutes are formed to provide additional corner structure from liner 110. That is, at the first fold point 603, a first secondary fold flute 610 is formed from facing 110 inside of a first primary fold flute 605. Likewise, a second secondary fold flute 611 is formed from facing 110 inside of a second primary fold flute 606. Secondary flutes 610 and 611 provide additional corner strength in boxes and containers.

Figure 7:
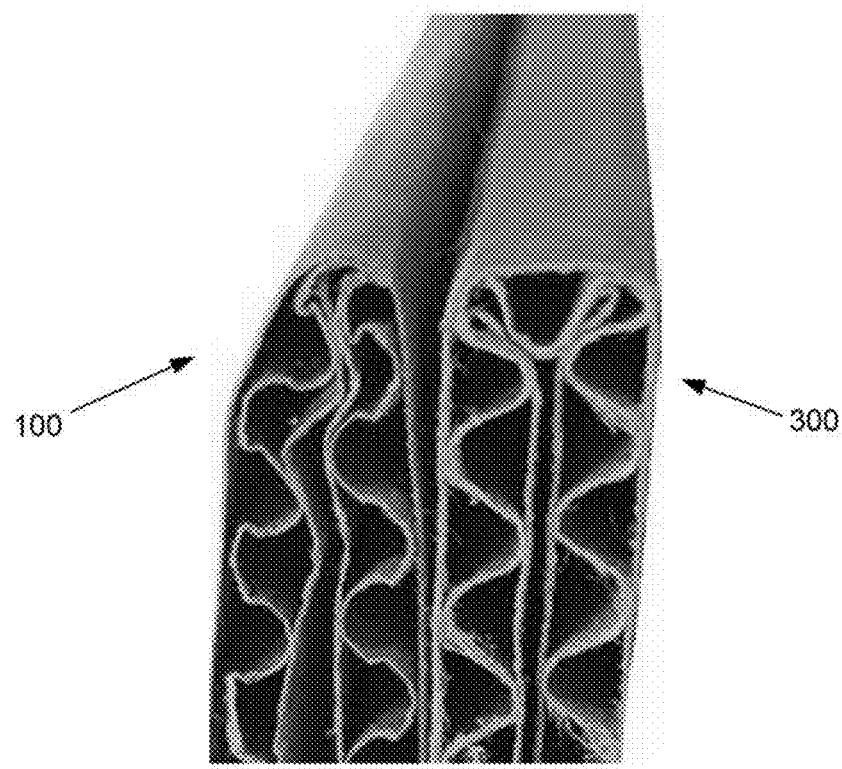
FIG. 7 shows a side-by-side comparison of an articulated conventional board product and an articulate board product of FIG. 5.

FIG. 7 shows a side-by-side comparison of an articulated conventional board product 100 and an articulate board product 300 of FIG. 5. As can be seen, the conventional board 100 shows a distortion in the medium structure at and adjacent to the 180 degree articulation point. Here, the underlying flutes have been compromised because the fold point did not happen to line up with a respective flute in the medium. This corner will have demonstrably less predictability in folding. Differently, the embodiment of the board product with precisely located score lines exhibits the additional secondary flutes as discussed above with respect to FIG. 6C. This articulation point in the board product 300 will have superior strength when compared to the conventional example 100.

Figure 8A:
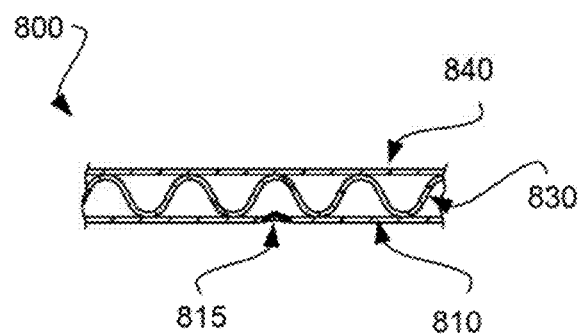
FIGS. 8A-8B are views of a board product before and after articulation with benefit of one score line in one or more facings according to an embodiment of the subject matter disclosed herein.
Figure 8B:
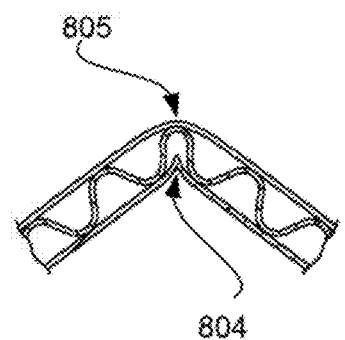

FIGS. 8A-8B are views of a board product before and after articulation with benefit of one score line in one or more facings according to an embodiment of the subject matter disclosed herein. In FIG. 8A, the board product 800 is shown from a edge view so as to better illustrate what happens when the board product 800 is articulated. As shown, the board product 800 includes a first facing 810, a second facing 840 and a medium 830. The medium 830 is disposed between the first facing 810 and the second facing 840. The first facing may further include one score line 815. In this example view of FIG. 8A, the first facing 810 is shown facing down simply for illustrative purposes. Further, only one score line 815 is shown that is precisely located below an apex of a flute in the medium 830. Further yet, the medium 830 is shown having a sinusoidal flute profile, though it is understood that any shape of flute profile may be used and the medium 830 may be embossed or corrugated.

In the next view of FIG. 88, the board product 300 has begun articulation. Here, the fold line will follow precisely the score line 815 in the facing 810. Thus a first fold point 804 corresponds to a first score line 815. As can be seen is this view of FIG. 88, an articulation will result in an eventual approximately 90 degree articulation without damage to underlying flutes. Further, the fold point 804 is located directly between two apexes (of downward facing flutes—i.e., two apexes affixed to the first facing 810) of the medium 830 such that the legs of this flute begin to move toward each other. As a result, a stretch point 805 of the second facing 840 begins to forms directly over the fold point 804. With a precisely located score line 815, a 90 degree fold may be realized without causing undesired damage to the flutes of the medium 830. Additional aspects of various embodiments of board products are discussed next with respect to the machine of FIG. 9.

Figure 9:
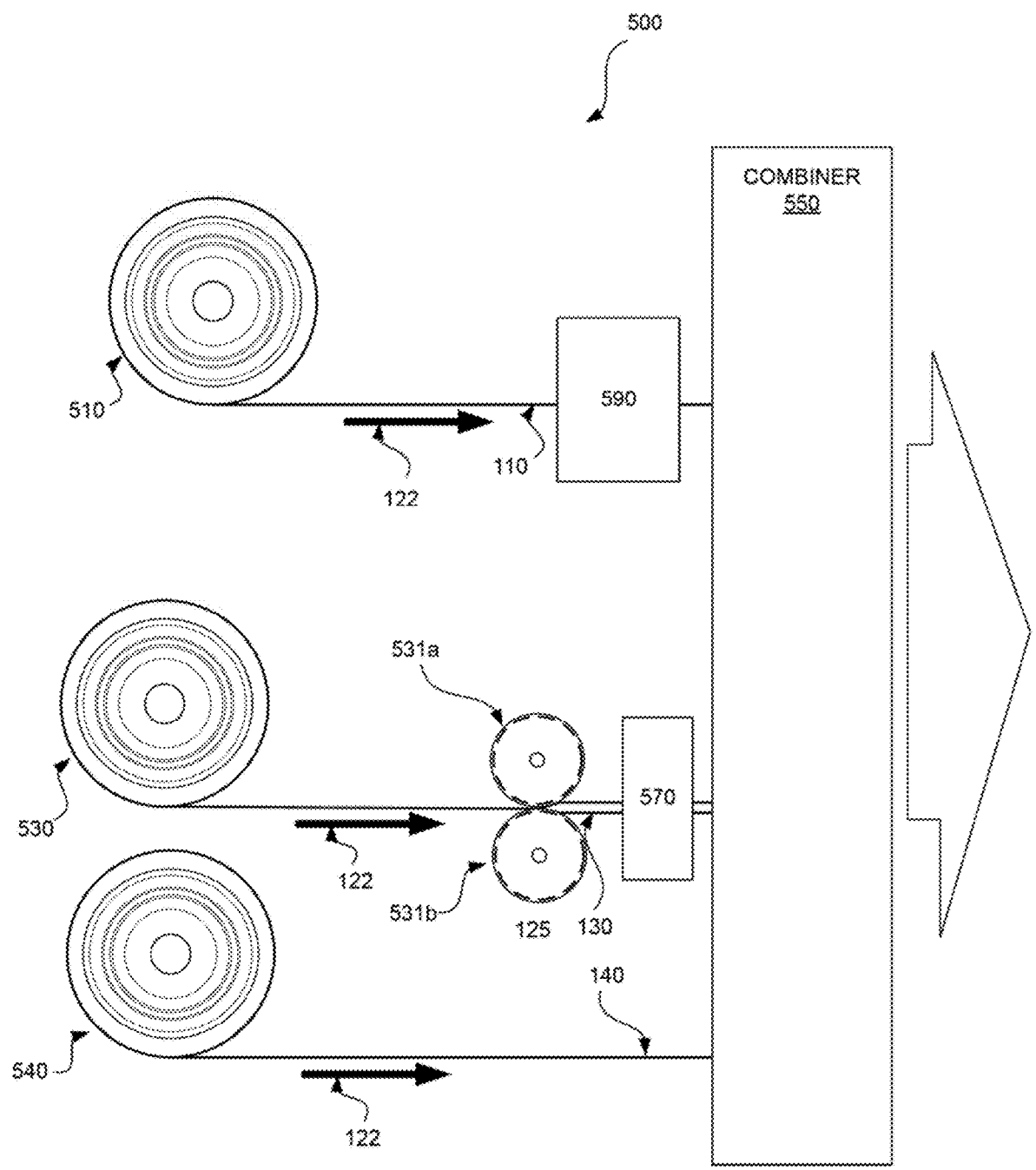
FIG. 9 is a diagram of aspects of a machine configured to produce the board product of FIG. 3 according to an embodiment of the subject matter disclosed herein.

FIG. 9 is a diagram of aspects of a machine 500 configured to produce the board product 300 of FIG. 5 according to an embodiment of the subject matter disclosed herein. The machine 500 may produce other embodiments as well including the embodiment of the board product 800 from FIG. 8A. The machine 500 includes three feed rolls 510, 530, and 540 of paper that are used to produce a board product. These feed rolls include a first facing feed roll 510, an embossed medium feed roll 530, and a second facing feed roll 540. Note that the paper that is wound on the first facing feed roll 510 is prior to scoring and the paper that is wound on the embossed medium feed roll 530 is prior to embossing. The weights and composition of the paper for each respective feed roll may be different and designed specifically for the respective purpose.

The paper from each roll may be unwound from each respective roll and fed toward a combiner 550 that is configured to combine the various layers of paper together to form a resultant board product. Prior to entering the combiner 550, at least some of the paper from the feed rolls may be passed through one or more stages for scoring the paper. Thus, the first facing feed roll 510 may feed paper into a scoring stage 590 that scores the paper with impressions in a precise manner. In other embodiments, the lines impressed upon the facing 110 may be perforations, intermittent cuts or some other form of localized weakening the facing 110 along a precise line. As the paper exits the scoring stage 590, it becomes the scored facing 110 as discussed above with respect to FIG. 3. The scored facing 110 is then fed into the combiner 550 to be combined with other materials.

Further, also prior to entering the combiner 550, at least some of the paper from the feed rolls may be passed through one or more stages for forming the paper into a medium. As used herein and in the industry, a medium may refer to a paper product that has been formed into paper having flutes. Thus, the embossed medium feed roll 530 may feed paper into first and second embossing rolls 531a and 531b that are aligned with respect to each other. As the paper exits the embossing stage (e.g., embossing rolls 531a and 531b), it becomes the embossed medium 130 as discussed above with respect to FIG. 4. The embossed medium 130 is then fed into the combiner 550 to be combined with other materials.

Once passed through the embossing rolls 531a and 531b, the embossed medium 130 may be passed to an applicator 570 for applying adhesive to the newly formed apexes. The applicator may include a device for identifying the locations of each apex and then aligning a series of adhesive dispensers with the identified apexes. In other embodiments, adhesive may be transferred to the flute tips with a glue roll or rolls where the paper contacts a glue film and adheres to the flute tips. In this manner, adhesive may be applied with precision in a continuous and uniform manner. Then, the first facing 110, the embossed medium 130, and the second facing 140 are combined in the combiner 550 using various techniques such as adhesion, curing, wetting, drying, heating, and chemical treatment. The resultant board product 300 features at least one scored facing precisely aligned with at least one linearly-embossed medium 130 wherein the board product may be articulated with accuracy.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A board product, comprising:
   a paper facing having a plurality of score lines impressed in the paper facing; and
   a paper medium that includes fibers substantially aligned in a machine direction, the paper medium further including a plurality of flutes having respective axes aligned in the machine direction;
   wherein the paper medium is coupled to the paper facing such that the plurality of score lines are parallel to the axes of the plurality of flutes and parallel to the fibers of the paper medium; and
   wherein each score line is equidistant from each of two adjacent flute axis apexes.

2. The board product of claim 1, further comprising a second paper facing affixed with respect to the paper medium.

3. The board product of claim 2, wherein the second paper facing includes a plurality of score lines impressed in the paper facing.

4. The board product of claim 1, further comprising a second paper medium affixed with respect to the paper facing.

5. The board product of claim 1, wherein the paper medium further comprises a linearly embossed medium.

6. The board product of claim 1, wherein the plurality of score lines cover less than all of the area of the paper facing.

7. The board product of claim 1, wherein the plurality of score lines are respectively aligned with the plurality of flutes such that the board product may be precisely articulated in a plane normal to at least one score line.

8. A board product, comprising:
   a facing formed from a paper medium and having a plurality of score lines impressed in the paper medium; and
   a linearly embossed medium having a plurality of aligned fibers and having a plurality of flutes having respective axes that are aligned with the plurality of aligned fibers, the embossed medium coupled to the facing such that the plurality of score lines are respectively aligned in a parallel manner with respect to the axes of the plurality of flutes and aligned with the plurality of aligned fibers.

9. The board product of claim 8, further comprising a second facing affixed with respect to the embossed medium.

10. The board product of claim 9, wherein the second facing includes a plurality of score lines impressed in the paper prior to combining the facing with any other paper medium.

11. The board product of claim 8, further comprising a second paper medium affixed with respect to the paper facing.

12. The board product of claim 8, wherein the plurality of score lines are respectively aligned with the plurality of flutes such that each score line is equidistant from each adjacent flute axis.

13. The board product of claim 8, wherein the plurality of score lines cover less than all of the area of the facing.

14. The board product of claim 8, wherein the plurality of score lines are respectively aligned with the plurality of flutes such that the board product may be precisely articulated in a plane normal to at least one score line.

* * * * *